(12) United States Patent
McCormick

(10) Patent No.: US 7,343,862 B2
(45) Date of Patent: Mar. 18, 2008

(54) GAS GENERATING SYSTEM

(75) Inventor: David M. McCormick, St. Clair Shore, MI (US)

(73) Assignee: Automotive Systems Laboratory, Inc., Armada, MI (US)

( * ) Notice: Subject to any disclaimer, the term of this patent is extended or adjusted under 35 U.S.C. 154(b) by 0 days.

(21) Appl. No.: 11/138,226

(22) Filed: May 26, 2005

(65) Prior Publication Data

US 2005/0280252 A1 Dec. 22, 2005

Related U.S. Application Data

(60) Provisional application No. 60/574,919, filed on May 27, 2004.

(51) Int. Cl.
*B60R 21/26* (2006.01)
(52) U.S. Cl. .................. 102/530; 280/736; 280/741
(58) Field of Classification Search ............. 102/530, 102/531; 280/736, 741, 742, 737, 740
See application file for complete search history.

(56) References Cited

U.S. PATENT DOCUMENTS 2,891,525 A  6/1959  Moore .................. 123/90.51

(Continued)

FOREIGN PATENT DOCUMENTS

DE  40 19 877 A1  6/1990

(Continued)

OTHER PUBLICATIONS

WO 98/39183; Title: Multi-Chamber Inflator; International Publication Date: Sep. 11, 1998; Inventors: Shahid A. Siddiqul and Rickey Lee Stratton; Applicant: Automotive Systems Laboratory, Inc.

(Continued)

*Primary Examiner*—James S Bergin
(74) *Attorney, Agent, or Firm*—L.C. Begin & Associates, PLLC

(57) ABSTRACT

A gas generating system (10) including a baffle system for cooling a gas generated by the gas generating system. The baffle system (40) includes a first enclosure and a second enclosure (80) spaced apart from a wall (14) of the first enclosure to define a first fluid flow passage (86) extending between the second enclosure (80) and the wall (14). The second enclosure (80) defines a baffle chamber (92) therein. The second enclosure (80) also includes at least one opening (94) for enabling fluid communication between a gas source and the second enclosure baffle chamber (92), and at least one opening (96) for enabling fluid communication between the second enclosure baffle chamber (92) and the first fluid flow passage (86). A third enclosure (32) is also provided spaced apart from the wall (14) of the first enclosure to define a second fluid flow passage (98) extending between the third enclosure (32) and the wall (14). The second fluid flow passage (98) is in fluid communication with the first fluid flow passage (86). The third enclosure (32) defines a baffle chamber (102) therein, and also includes at least one opening (104) for enabling fluid communication between the second fluid flow passage (98) and the third enclosure baffle chamber (102), and at least one opening (106) for enabling fluid communication between the third enclosure baffle chamber (102) and an exterior of the gas generating system. A method for cooling gases is also disclosed.

16 Claims, 3 Drawing Sheets

U.S. PATENT DOCUMENTS

| | | | |
|---|---|---|---|
| 3,794,347 A | 2/1974 | Zens | 280/150 |
| 3,877,882 A * | 4/1975 | Lette et al. | 422/164 |
| 3,880,447 A | 4/1975 | Thorn et al. | |
| 3,958,949 A | 5/1976 | Plantif et al. | |
| 3,985,076 A | 10/1976 | Schneiter et al. | |
| 4,001,750 A | 1/1977 | Scherer et al. | 337/280 |
| 4,012,189 A | 3/1977 | Vogt et al. | 431/353 |
| 4,215,631 A | 8/1980 | Rucker | 102/27 |
| 4,530,516 A | 7/1985 | Adams et al. | 280/741 |
| 4,611,374 A | 9/1986 | Schnelle et al. | 29/890.13 |
| 4,722,551 A | 2/1988 | Adams | |
| 4,730,558 A | 3/1988 | Florin et al. | 102/218 |
| 4,762,067 A | 8/1988 | Barker et al. | 102/313 |
| 4,886,293 A | 12/1989 | Weiler et al. | |
| 4,950,458 A | 8/1990 | Cunningham | 422/164 |
| 5,028,070 A | 7/1991 | Bender | |
| 5,048,862 A | 9/1991 | Bender et al. | |
| 5,100,171 A | 3/1992 | Faigle et al. | 280/736 |
| 5,215,721 A | 6/1993 | Tasaki et al. | |
| 5,294,244 A | 3/1994 | Allerton, III et al. | 75/401 |
| 5,318,323 A | 6/1994 | Pietz | |
| 5,333,656 A | 8/1994 | Mackal | 141/330 |
| 5,340,150 A | 8/1994 | Harada et al. | |
| 5,372,449 A | 12/1994 | Bauer et al. | 403/273 |
| 5,387,009 A | 2/1995 | Lauritzen et al. | |
| 5,406,889 A | 4/1995 | Letendre et al. | |
| 5,443,286 A | 8/1995 | Cunningham et al. | |
| 5,466,420 A | 11/1995 | Parker et al. | |
| 5,509,686 A | 4/1996 | Shepherd et al. | 280/738 |
| 5,516,147 A | 5/1996 | Clark et al. | 280/737 |
| 5,533,751 A | 7/1996 | Kort et al. | 280/737 |
| 5,556,439 A | 9/1996 | Rink et al. | 55/487 |
| 5,562,304 A | 10/1996 | Gest | |
| 5,564,743 A | 10/1996 | Marchant | 280/741 |
| 5,582,427 A | 12/1996 | Rink et al. | 280/740 |
| 5,588,676 A | 12/1996 | Clark et al. | 280/741 |
| 5,609,360 A | 3/1997 | Faigle et al. | 280/740 |
| 5,611,566 A | 3/1997 | Simon et al. | 280/736 |
| 5,613,703 A | 3/1997 | Fischer | 280/741 |
| 5,622,380 A | 4/1997 | Khandhadia et al. | 280/736 |
| 5,624,133 A | 4/1997 | Wong | |
| 5,624,134 A | 4/1997 | Iwai et al. | |
| 5,628,528 A | 5/1997 | DeSautelle et al. | 280/736 |
| 5,630,619 A | 5/1997 | Buchanan et al. | 280/741 |
| 5,662,722 A | 9/1997 | Shiban | 55/413 |
| 5,702,494 A | 12/1997 | Tompkins et al. | 55/498 |
| 5,725,245 A | 3/1998 | O'Driscoll et al. | |
| 5,799,973 A | 9/1998 | Bauer et al. | 280/741 |
| 5,813,695 A | 9/1998 | O'Driscoll et al. | |
| 5,829,785 A | 11/1998 | Jordan et al. | 280/741 |
| 5,845,935 A | 12/1998 | Enders et al. | 280/743.2 |
| 5,860,672 A | 1/1999 | Petersen | 280/728.2 |
| 5,872,329 A | 2/1999 | Burns et al. | 149/36 |
| 5,934,705 A | 8/1999 | Siddiqui et al. | 280/736 |
| 5,941,562 A | 8/1999 | Rink et al. | 280/741 |
| 5,970,880 A | 10/1999 | Perotto | 102/531 |
| 6,019,389 A | 2/2000 | Burgi et al. | 280/736 |
| 6,032,979 A | 3/2000 | Mossi et al. | 280/741 |
| 6,074,502 A | 6/2000 | Burns et al. | |
| 6,095,556 A | 8/2000 | Bailey et al. | 280/737 |
| 6,095,559 A * | 8/2000 | Smith et al. | 280/741 |
| 6,095,561 A | 8/2000 | Siddiqui et al. | 280/472 |
| 6,106,000 A | 8/2000 | Stewart | 280/728.2 |
| 6,116,491 A | 9/2000 | Katoh | 228/42 |
| 6,149,193 A | 11/2000 | Canterberry et al. | 280/741 |
| 6,210,505 B1 | 4/2001 | Khandhadia et al. | 149/36 |
| 6,244,623 B1 | 6/2001 | Moore et al. | 280/741 |
| 6,379,627 B1 * | 4/2002 | Nguyen et al. | 422/165 |
| 6,464,254 B2 | 10/2002 | Chikaraishi et al. | 280/741 |
| 6,474,684 B1 | 11/2002 | Ludwig et al. | |
| 6,485,051 B1 | 11/2002 | Taguchi et al. | |
| 6,581,963 B2 | 6/2003 | Mangum | 280/741 |
| 6,709,012 B1 | 3/2004 | Tanaka et al. | |
| 6,764,096 B2 | 7/2004 | Quioc | |
| 6,776,434 B2 | 8/2004 | Ford et al. | 280/729 |
| 6,846,014 B2 | 1/2005 | Rink et al. | 280/740 |
| 6,851,705 B2 | 2/2005 | Young et al. | |
| 6,871,873 B2 | 3/2005 | Quioc et al. | 280/741 |
| 6,908,104 B2 | 6/2005 | Canterberry et al. | 280/736 |
| 6,929,284 B1 | 8/2005 | Saso et al. | |
| 6,935,655 B2 | 8/2005 | Longhurst et al. | 280/736 |
| 6,945,561 B2 | 9/2005 | Nakashima et al. | |
| 6,948,737 B2 | 9/2005 | Ohji et al. | |
| 6,976,702 B2 | 12/2005 | Yakota et al. | 280/730.2 |
| 7,073,820 B2 | 7/2006 | McCormick | 280/741 |
| 7,178,830 B2 | 2/2007 | Blackburn | 280/736 |
| 7,237,801 B2 | 7/2007 | Quioc et al. | 280/736 |
| 7,267,365 B2 | 9/2007 | Quioc | 280/736 |
| 2002/0053789 A1 | 5/2002 | Fujimoto | |
| 2003/0127840 A1 | 7/2003 | Nakashima et al. | |
| 2003/0155757 A1 | 8/2003 | Larsen et al. | |
| 2003/0201628 A1 | 10/2003 | Choudhury et al. | 280/729 |
| 2004/0046373 A1 | 3/2004 | Wang et al. | |
| 2005/0001414 A1 | 1/2005 | Matsuda et al. | 280/736 |
| 2005/0134031 A1 | 6/2005 | McCormick | |
| 2005/0161925 A1 | 7/2005 | Blackburn | 280/741 |
| 2005/0194772 A1 | 9/2005 | Numoto et al. | 280/741 |
| 2005/0230949 A1 | 10/2005 | Blackburn | |
| 2005/0263993 A1 | 12/2005 | Blackburn | |
| 2005/0263994 A1 | 12/2005 | Quioc | |
| 2005/0280252 A1 | 12/2005 | McCormick | |
| 2006/0005734 A1 | 1/2006 | McCormick | |
| 2006/0043716 A1 | 3/2006 | Quioc | |
| 2006/0082112 A1 | 4/2006 | Blackburn | 280/736 |

FOREIGN PATENT DOCUMENTS

| | | |
|---|---|---|
| DE | 42 27 547 A1 | 2/1994 |
| EP | 0602785 B1 | 10/1993 |
| EP | 0728633 A1 | 2/1996 |
| EP | 0844149 A1 | 11/1997 |
| EP | 0 864 470 A1 | 9/1998 |
| EP | 1122134 B1 | 7/2000 |
| EP | 1308353 A2 | 9/2002 |
| JP | 04055151 A | 2/1992 |
| JP | 05096147 | 4/1993 |
| JP | 05178155 A | 7/1993 |
| JP | 05178156 A | 7/1993 |
| JP | 06227358 A | 8/1994 |
| WO | WO 98/39183 | 9/1998 |
| WO | WO 2004/091982 A1 | 10/2004 |
| WO | WO 2005/058645 A2 | 6/2005 |
| WO | WO 2005/086917 | 9/2005 |
| WO | WO 2006/044516 A2 | 4/2006 |
| WO | WO 2006/078819 A2 | 7/2006 |

OTHER PUBLICATIONS

U.S. Appl. No. 11/251,255.
U.S. Appl. No. 11/358,786.

* cited by examiner

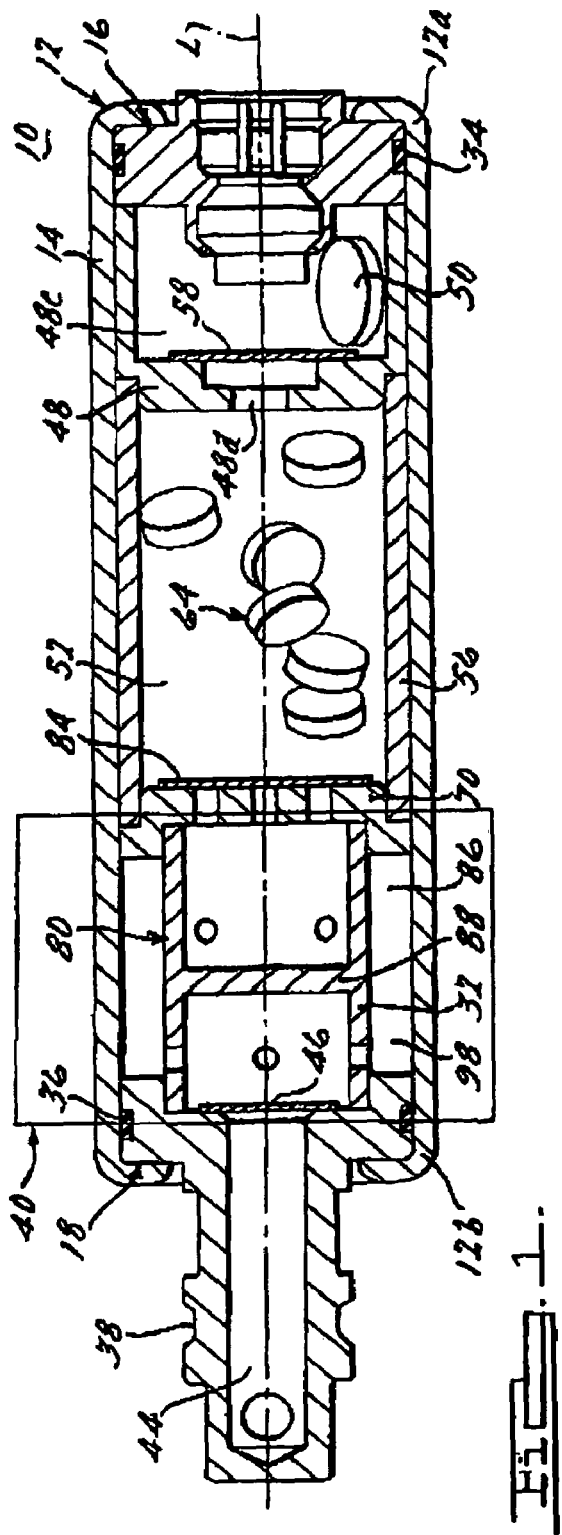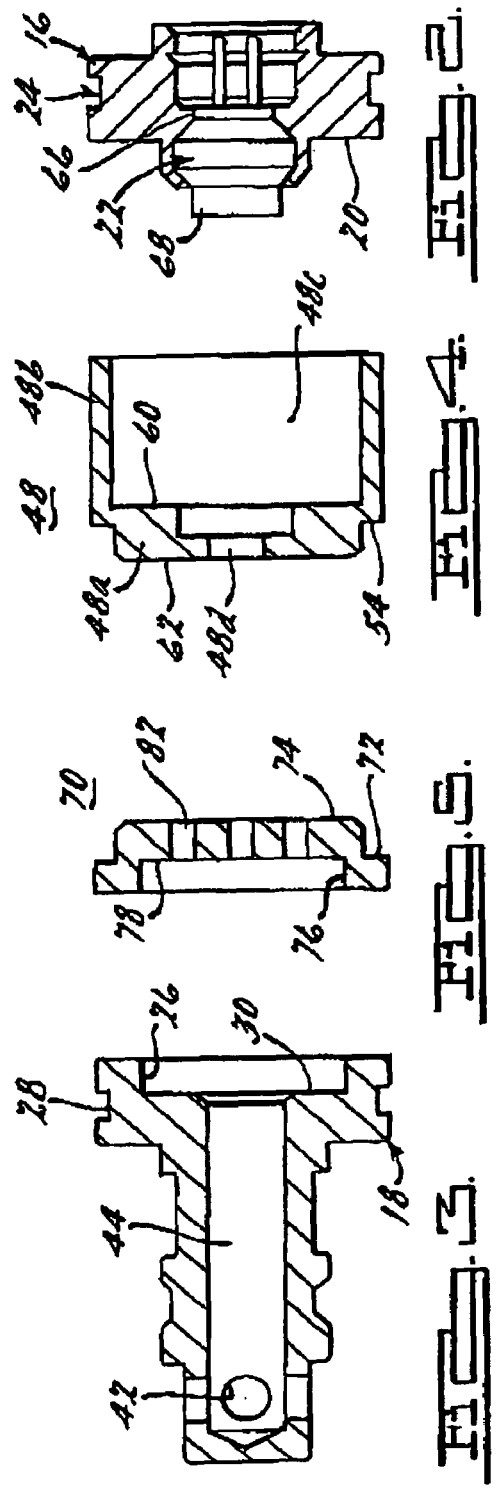

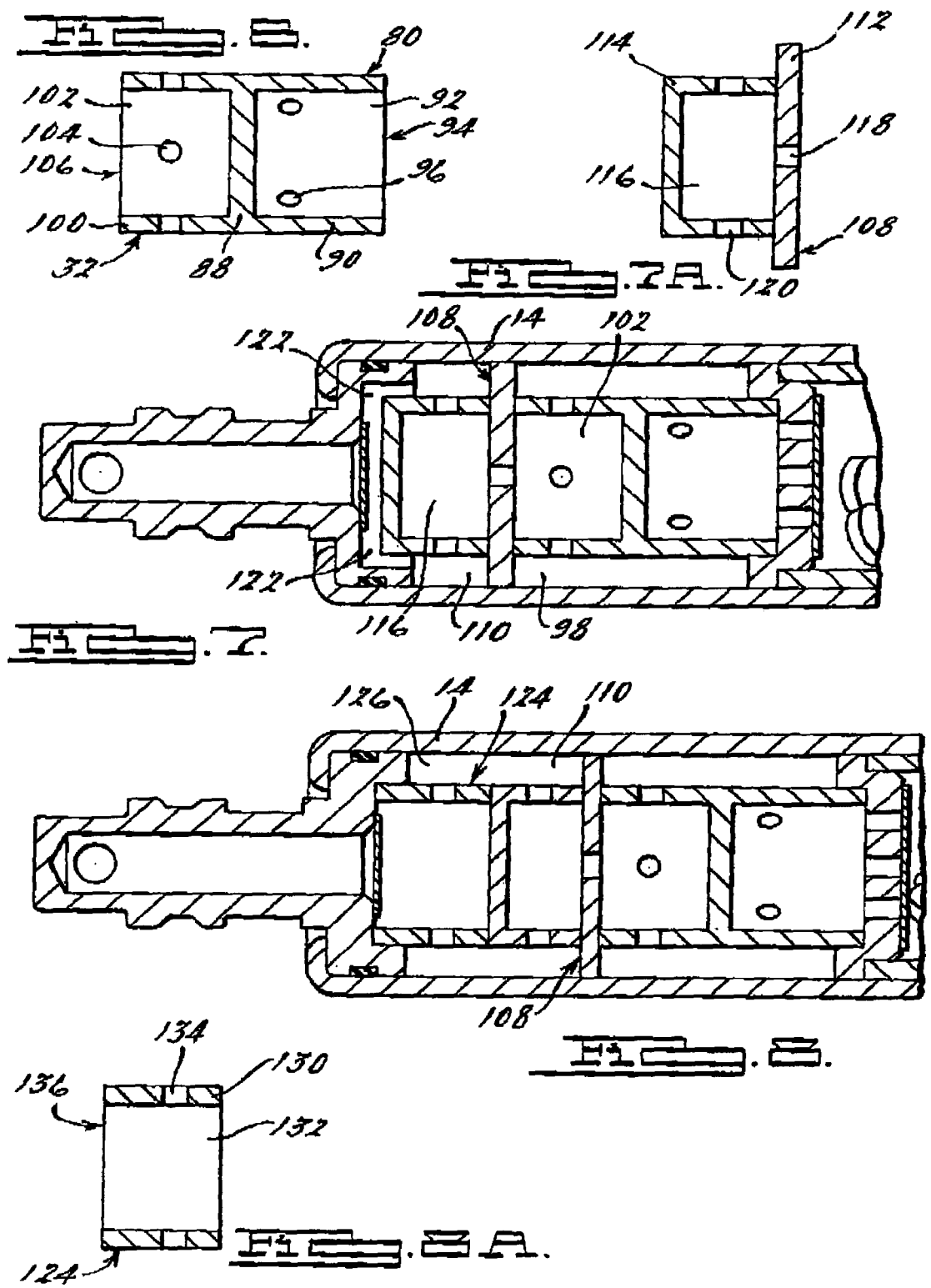

GAS GENERATING SYSTEM

CROSS-REFERENCE TO RELATED APPLICATIONS

This application claims the benefit of provisional application Ser. No. 60/574,919 filed on May 27, 2004.

BACKGROUND OF THE INVENTION

The present invention relates generally to gas generating systems and, more particularly, to filterless gas generating systems for use in applications such as inflatable occupant restraint systems in motor vehicles.

Installation of inflatable occupant protection systems, generally including airbag systems as standard equipment in all new vehicles has intensified the search for smaller, lighter and less expensive protection systems. Accordingly, since the inflation gas generator used in such protection systems tends to be the heaviest and most expensive component, there is a need for a lighter and less expensive gas generating system.

A typical gas generating system includes cylindrical steel, aluminum, or composite housing having a diameter and length related to the vehicle application and characteristics of a gas generant composition contained therein. Inhalation by a vehicle occupant of particulates generated by gas generant combustion during airbag activation can be hazardous. Thus, the gas generating system is generally provided with an internal or external filter comprising one or more layers of steel screen of varying mesh and wire diameter. Gas produced upon combustion of the gas generant passes through the filter before exiting the gas generating system. Particulate material, or slag, produced during combustion of the gas generant in a conventional system is substantially removed as the gas passes through the filter. In addition, heat from combustion gases is transferred to the material of the filter as the gases flow through the filter. Thus, as well as filtering particulates from the gases, the filter acts to cool the combustion gases prior to dispersal into an associated airbag. However, inclusion of the filter in the gas generating system increases the complexity, weight, and expense of the gas generating system. While various gas generant formulations have been developed in which the particulates resulting from combustion of the gas generant are substantially eliminated or significantly reduced, certain types of gas generants are still desirable notwithstanding the relatively high percentage of combustion solids they produce, given favorable characteristics of these gas generants such as burn rate, sustained combustion, and repeatability of performance.

Other ongoing concerns with gas generating systems include the ability to achieve any one of a variety of ballistic profiles by varying as few of the physical parameters of the gas generating system as possible and/or by varying these physical parameters as economically as possible. Also important are the need to increase manufacturing efficiency and the need to reduce manufacturing costs.

SUMMARY OF THE INVENTION

The present invention provides a gas generating system including a baffle system for cooling a gas generated by the gas generating system. The baffle system includes a first enclosure and a second enclosure spaced apart from a wall of the first enclosure to define a first fluid flow passage extending between the second enclosure and the wall. The second enclosure defines a baffle chamber therein. The second enclosure also includes at least one opening for enabling fluid communication between a gas source and the second enclosure baffle chamber, and at least one opening for enabling fluid communication between the second enclosure baffle chamber and the first fluid flow passage. A third enclosure is also provided spaced apart from the wall of the first enclosure to define a second fluid flow passage extending between the third enclosure and the wall. The second fluid flow passage is in fluid communication with the first fluid flow passage. The third enclosure defines a baffle chamber therein, and also includes at least one opening for enabling fluid communication between the second fluid flow passage and the third enclosure baffle chamber, and at least one opening for enabling fluid communication between the third enclosure baffle chamber and an exterior of the gas generating system.

In another aspect of the present invention, a method for cooling a gas is provided. The method includes the steps of providing a first enclosure and providing a second enclosure spaced apart from a wall of the first enclosure to define a first fluid flow passage between the second enclosure and the wall. The second enclosure defines a baffle chamber therein and includes at least one first opening for enabling fluid communication between a gas source and the second enclosure baffle chamber. The second enclosure also includes at least one second opening for enabling fluid communication between the second enclosure baffle chamber and the first fluid flow passage. A third enclosure is also provided spaced apart from the wall of the first enclosure to define a second fluid flow passage between the third enclosure and the wall. The second fluid flow passage is in fluid communication with the first fluid flow passage. The third enclosure defines a baffle chamber therein. The third enclosure also includes at least one first opening for enabling fluid communication between the second fluid flow passage and the third enclosure baffle chamber, and at least one second opening for enabling fluid communication between the third enclosure baffle chamber and an exterior of the third enclosure. Gas from the gas source is directed through the at least one first opening of the second enclosure into the second enclosure baffle chamber. The gas is then directed through the at least one second opening of the second enclosure, out of the second enclosure baffle chamber and into the first fluid flow passage. The gas is then directed out of the first fluid flow passage and into the second fluid flow passage, then out of the second fluid flow passage through the at least one first opening of the third enclosure and into the third enclosure baffle chamber, then through the at least one second opening of the third enclosure from the third enclosure baffle chamber to an exterior of the third enclosure baffle chamber. Heat from the gas is transferred to the enclosures during passage of the gas through the baffle chambers and flow passages, thereby cooling the gas during passage of the gas between the gas source and the exterior of the third enclosure.

BRIEF DESCRIPTION OF THE DRAWINGS

In the drawings illustrating embodiments of the present invention:

FIG. 1 is a cross-sectional side view of one embodiment of a gas generating system in accordance with the present invention;

FIG. 2 is a cross-sectional side view of a first end closure assembly in accordance with the present invention;

FIG. 4 is a cross-sectional side view of an igniter cup in accordance with the present invention;

FIG. 5 is a cross-sectional side view of a center plate in accordance with the present invention;

FIG. 6 is a cross-sectional side view of second and third baffle enclosures in accordance with the present invention;

FIG. 7 is a cross-sectional side view of a second embodiment of a gas generating system in accordance with the present invention;

FIG. 7A is a cross-sectional side view of a fourth baffle enclosure used in the embodiment shown in FIG. 7;

FIG. 8 is a cross-sectional side view of a third embodiment of a gas generating system in accordance with the present invention;

FIG. 8A is a cross-sectional side view of a fifth baffle enclosure used in the embodiment shown in FIG. 8; and FIG. 9 is a schematic representation of an exemplary vehicle occupant protection system incorporating a gas generating system in accordance with the present invention.

DETAILED DESCRIPTION

Figure 3:
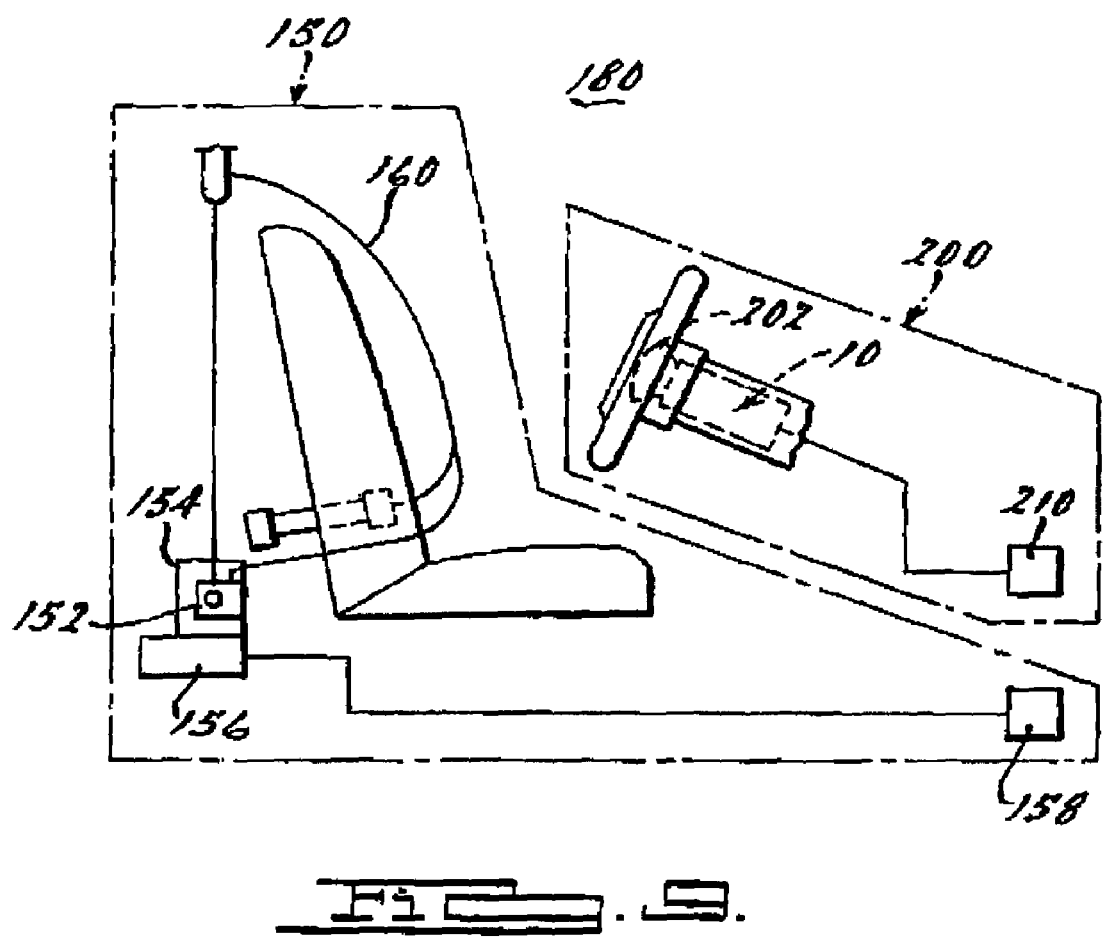
FIG. 3 is a cross-sectional side view of a second end closure assembly in accordance with the present invention.

The present invention broadly comprises a gas generating system that may be fabricated without the wire mesh filter or expanded metal filter required in earlier designs for removing particulate materials from a stream of inflation gas. A baffle system is employed in place of the filter whereby, upon gas generant combustion, slag is formed within the buffer system and gases are also cooled therein. Selection of suitable gas generant compositions capable of combusting to produce inflation gas without an undue quantity of particulates further obviates the need for a filter. Obviating the need for a filter enables the gas generating system to be simpler, lighter, less expensive, and easier to manufacture. Furthermore, the gas generating system described herein actually provides cooler output gases than many known inflators equipped with a typical filter/heat sink. Although the embodiments of the gas generating system described herein do not contain a filter, a filter formed by known or otherwise suitable methods may be included, if desired.

FIG. 1 shows one embodiment of a gas generating system 10 in accordance with the present invention. Gas generating system 10 includes a substantially cylindrical housing 12 having a pair of opposed ends 12a, 12b and a wall 14 extending between the ends to define a housing interior cavity. Housing 12 is made from a metal or metal alloy and may be a cast, stamped, drawn, extruded, or otherwise metal-formed. A first end closure 16 is secured to end 12a of housing 12, and a second end closure 18 is secured to an opposite end 12b of housing 12 using one or more known methods. In FIG. 1, ends 12a and 12b of housing 12 are crimped over portions of first and second end closures 16, 18 to secure the end closures within the housing.

Referring to FIGS. 1, 2, and 3, first end closure 16 has formed therealong a peripheral shoulder 20, a central orifice 22, and a peripheral cavity 24. Second end closure 18 has formed therealong an annular shoulder 26 and a peripheral cavity 28. Annular shoulder 26 is formed along a face 30 of the end closure and is dimensioned so that an end portion of a baffle enclosure 32 (FIG. 6) having a predetermined outer diameter may be positioned along face 30 to form an interference fit with shoulder 26, thereby suspending the baffle enclosure radially inward of housing wall 14. End closures 16, 18 may be stamped, extruded, die cast, or otherwise metal formed and may be made from carbon steel or stainless steel, for example. A first O-ring or seal 34 is positioned in peripheral cavity 24 to seal the interface between first end closure 16 and housing wall 14. A second O-ring or seal 36 is positioned in peripheral cavity 28 to seal the interface between second end closure 18 and housing wall 14.

In the embodiment shown in FIG. 1, gas generating system 10 also preferably contains a gas exit manifold 38 formed proximate housing second end 12b. Gas exit manifold 38 may be formed integrally with housing 12. Alternatively, gas exit manifold 38 may be machined or otherwise formed from steel or other suitable materials, and then welded or otherwise fixed to housing second end 12b. Gas exit manifold 38 functions to distribute gas flowing from baffle system 40 (described below) out housing second end 12b. A plurality of gas discharge orifices 42 is preferably spaced about a circumference of the gas exit manifold. The embodiment shown in FIG. 1 includes four gas discharge orifices 42 substantially evenly spaced about the circumference of the gas exit manifold. The gas exit manifold may incorporate a filter (not shown) therein to filter combustion products from the inflation fluid prior to gas distribution. Any suitable metallic mesh filter or woven wire cloth may be used, many examples of which are known and obtainable from commercially available sources (for example, Wayne Wire Cloth Products, Inc. of Kalkaska or Bloomfield Hills, Mich.)

Second end closure 18 has a shaft 44 extending therethrough to enable fluid communication between baffle system 40 (described below) and gas exit manifold 38. In the embodiment shown in FIG. 1, a rupturable, fluid-tight seal 46 is positioned across and end portion of shaft 44 proximate baffle system 40 to fluidly isolate the baffle system from the gas exit manifold prior to activation of the gas generating system. Seal 46 is secured to a face of second end closure 18 and forms a fluid-tight barrier between gas exit manifold 38 and baffle system 40. Various disks, foils, films, tapes, etc. may be used to form the seal.

Referring to FIGS. 1 and 4, an ignition cup 48 is positioned adjacent first end closure 16, and is nested within housing 12 for a portion of the housing length. Ignition cup 48 has a base portion 48a and a wall 48b extending from the base portion to abut first end closure 16 along first end closure shoulder 20. Base portion 48a, wall 48b, and first end closure 16 define a cavity 48c for containing a pyrotechnic compound 50 therein.

At least one ignition gas exit orifice 48d is formed in ignition cup 48 for release of ignition compound combustion products once ignition compound 50 is ignited. In the embodiment shown in FIGS. 1 and 4, the diameter of ignition orifice 48d is telescoped from a greater diameter adjacent cavity 48c to a smaller diameter adjacent a gas generant combustion chamber 52 (described in greater detail below). The reduction in diameter along the length of gas exit orifice 48d creates a Venturi effect as the ignition combustion products flow from cavity 48c through orifice 48d and into combustion chamber 52. An annular recess 54 is formed in base portion 48a and is dimensioned so that an end portion of an annular sleeve 56 (described below) having a predetermined inner diameter may be positioned within recess 54 to form an interference fit with base portion 48a. Ignition cup 48 may be stamped, extruded, die cast, or otherwise metal formed and may be made from carbon steel or stainless steel, for example.

In the embodiment shown in FIG. 1, a rupturable, fluid-tight seal 58 is positioned across ignition orifice 48d to fluidly isolate cavity 48c from main combustion chamber 52 prior to activation of the gas generating system. Seal 58 is secured to either of opposite faces 60 and 62 of ignition cup base portion 48a and forms a fluid-tight barrier between cavity 48c and main combustion chamber 52. Various disks, foils, films, tapes, etc. may be used to form the seal.

Referring again to FIGS. 1 and 4, a quantity of a pyrotechnic compound 50 is contained within cavity 48c. In the embodiment shown in FIGS. 1 and 4, pyrotechnic compound 50 is a known or suitable ignition or booster compound, whose combustion ignites a second, main gas generant charge 64 positioned in combustion chamber 52. In an alternative embodiment, pyrotechnic compound 50 in cavity 48c comprises the main gas generant charge for the gas generating system. This alternative embodiment may be used in applications in which a relatively small amount of inflation gas (and, therefore, a correspondingly smaller amount of gas generant) is needed. One or more autoignition tablets (not shown) may be placed in cavity 48c, allowing ignition of pyrotechnic compound 50 upon external heating in a manner well-known in the art.

Referring again to FIGS. 1 and 2, an igniter assembly 66 is positioned and secured within first end closure central orifice 22 so as to enable operative communication between cavity 48a containing ignition compound 50 and an igniter 68 incorporated into the igniter assembly, for igniting ignition compound 50 upon activation of the gas generating system. Igniter assembly 66 may be secured in central orifice 22 using any one of several known methods, for example, by welding, crimping, using an interference fit, or by adhesive application. An igniter assembly suitable for the application described herein may be obtained from any of a variety of known sources, for example Primex Technologies, Inc. of Redmond, Wash. or Aerospace Propulsion Products by, of The Netherlands.

Referring to FIGS. 1 and 5, a perforate center plate 70 is press fit within housing 12. An annular recess 72 is formed on a face 74 of center plate 70 along a periphery of the plate. Recess 72 is dimensioned so that an end portion of annular sleeve 56 (described below) having a predetermined inner diameter may be positioned within recess 72 to form an interference fit with center plate 70. An annular shoulder 76 is formed along a face 78 of center plate 70 opposite face 74 and is dimensioned so that an end portion of a baffle enclosure 80 (described below) having a predetermined outer diameter may be positioned along center plate face 78 to form an interference fit with shoulder 76. At least one orifice 82 is provided in center plate 70 to enable fluid communication between gas generant combustion chamber 52 and a baffle system generally designated 40 (described in greater detail below). In the embodiment shown in FIGS. 1 and 5, a plurality of orifices 82 is formed in center plate 70. Center plate 70 is made from a metal or metal alloy and may be a cast, stamped, drawn, extruded, or otherwise metal-formed.

In the embodiment shown in FIG. 1, a rupturable, fluid-tight seal 84 is positioned across orifices 82 to fluidly isolate baffle system 40 from combustion chamber 52 prior to activation of the gas generating system. Seal 84 is secured to face 74 of center plate 70 and forms a fluid-tight barrier between baffle system 40 and combustion chamber 52. Various disks, foils, films, tapes, etc. may be used to form the seal.

As described previously, recess 54 in ignition cup 48 and recess 72 in center plate 70 are adapted to accommodate end portions of an annular sleeve 56 therein. In the embodiment of the gas generating system shown in FIG. 1, sleeve 56 is incorporated into housing 12 to strengthen wall 14 of the housing during operation of the gas generating system.

Referring again to FIG. 1, a gas generant combustion chamber 52 is defined by annular sleeve 56, center plate 70, and ignition cup 48. Upon activation of the gas generating system, combustion chamber 52 fluidly communicates with cavity 48c by way of ignition cup telescopic orifice 48d.

Referring again to FIG. 1, a gas generant composition 64 is positioned within combustion chamber 52. "Smokeless" gas generant compositions are especially applicable to gas generating systems according to the present invention, although the present invention is not limited to the use of smokeless gas generant compositions therein. Suitable gas generants are exemplified by, but not limited to, compositions and processes described in U.S. Pat. Nos. 5,872,329, 6,074,502, 6,287,400, 6,306,232 and 6,475,312 incorporated by reference herein. As used herein, the term "smokeless" should be generally understood to mean such propellants as are capable of combustion yielding at least about 90% gaseous products based on a total product mass; and, as a corollary, no more than about 10% solid products based on a total product mass. It has been generally found that the use of gas generant compositions having the combustion characteristics described in cited patents helps obviate the need for the filters used in other gas generating system designs.

Gas generant composition 52 positioned in enclosure 50 may be any known gas generant composition useful for airbag application and is exemplified by, but not limited to, compositions and processes described in U.S. Pat. Nos. 5,035,757, 5,872,329, 6,074,502, 6,287,400, 6,306,232 and 6,475,312 each incorporated by reference herein. Other suitable compositions are set forth in the U.S. patent application Ser. Nos. 10/407,300 and 60/369,775, incorporated by reference herein.

U.S. Pat. No. 5,037,757 discloses azide-free gas generants including tetrazole compounds such as aminotetrazole, tetrazole, bitetrazole and metal salts of these compounds, as well as triazole compounds such as 1,2,4-triazole-5-one or 3-nitro 1,2,4-triazole-5-one and metal salts of these compounds. Certain metal salts (alkaline earth metals) of these compounds can function, at least in part, as high temperature slag formers. For example, the calcium salt of tetrazole or bitetrazole forms, upon combustion, calcium oxide which would function as a high-temperature slag former. Magnesium, strontium, barium and possibly cerium salts would act in similar manner. In combination with a low-temperature slag former, a filterable slag would be formed. The alkali metal salts (lithium, sodium, potassium) could be considered, at least in part, as low-temperature slag formers since they could yield lower melting silicates or carbonates upon combustion.

Oxidizers generally supply all or most of the oxygen present in the system. In addition, however, they are the preferred method of including a high-temperature slag former into the reaction system. The alkaline earth and cerium nitrates are all oxidizers with high-temperature slag forming potential, although most of these salts are hygroscopic and are difficult to use effectively. Strontium and barium nitrates are easy to obtain in the anhydrous state and are excellent oxidizers. Alkali metal nitrates, chlorates and perchlorates are other useful oxidizers when combined with a high-temperature slag former.

Materials which function as high-temperature slag formers have melting points at, or higher, than the combustion temperature or decompose into compounds which have melting points, at or higher, than the combustion temperature. The alkaline earth oxides, hydroxides and oxalates are useful high-temperature slag formers. Magnesium carbonate and magnesium hydroxide are very useful high-temperature slag formers because they decompose before melting to form magnesium oxide which has a very high melting point (2800° C.). As mentioned above, oxidizers such as strontium nitrate are especially beneficial since they serve both as high-temperature slag former and oxidizer, thereby increasing the amount of gas produced per unit weight.

Metal salts as fuels, such as the calcium or strontium salt of 5-aminotetrazole, tetrazole, or ditetrazole are also useful high-temperature slag formers, although not as efficient as the oxidizers. Other metal oxides having high melting points such as the oxides of titanium, zirconium and cerium are also useful high-temperature slag formers.

Materials which function as low-temperature slag formers have melting points at or below the combustion temperature or form compounds during combustion which have melting points at or below the combustion temperature. Compounds such as silicon dioxide ($SiO_2$), boric oxide ($B_2O_3$), vanadium pentoxide ($V_2O_5$), sodium silicate ($Na_2SiO_3$), potassium silicate ($K_2SiO_3$), sodium carbonate ($Na_2CO_3$) and potassium carbonate ($K_2CO_3$) are examples of low-temperature slag formers.

It should be noted that either the oxidizer or the fuel can act as a low-temperature slag former if it contains a suitable substance which can be converted during combustion. For example, sodium nitrate or the sodium salt of tetrazole, during the combustion reactions, can convert to sodium carbonate or sodium silicate, if silicon dioxide is also present.

Set in the above context, the pyrotechnic, slag forming gas generating mixture disclosed in U.S. Pat. No. 5,037,757 comprises at least one each of the following materials.

a. A fuel selected from the group of tetrazole compounds consisting of aminotetrazole, tetrazole, bitetrazole and metal salts of these compounds as well as triazole compounds and metal salts of triazole compounds.

b. An oxygen containing oxidizer compound selected from the group consisting of alkali metal, alkaline earth metal, lanthanide and ammonium nitrates and perchlorates or from the group consisting of alkali metal or alkaline earth metal chlorates or peroxides.

c. A high temperature slag forming material selected from the group consisting of alkaline earth metal or transition metal oxides, hydroxides, carbonates, oxalates, peroxides, nitrates, chlorates and perchlorates or from the group consisting of alkaline earth metal salts of tetrazoles, bitetrazoles and triazoles.

d. A low-temperature slag forming material selected from the group consisting of silicon dioxide, boric oxide and vanadium pentoxide or from the group consisting of alkali metal silicates, borates, carbonates, nitrates, perchlorates or chlorates or from the group consisting of alkali metal salts of tetrazoles, bitetrazoles and triazoles or from the group consisting of the various naturally occurring clays and talcs.

In practice, certain of the materials may be substituted or interchanged. Specifically, both the fuel and the high-temperature slag forming material may be selected from the group consisting of alkaline earth metal salts of tetrazoles, bitetrazoles and triazoles. Both the oxygen containing oxidizer compound and high-temperature slag forming material may be comprised of one or more of the group consisting of alkaline earth metal and lanthanide nitrates, perchlorates, chlorates and peroxides. Both the fuel and the low-temperature slag forming material may comprise one or more of the group consisting of alkali metal salts of tetrazoles, bitetrazoles and triazoles. Both the oxygen containing oxidizer compound and the low-temperature slag forming material may comprise one or more of the group consisting of alkali metal nitrates, perchlorates, chlorates and peroxides.

The fuel may comprise 5-aminotetrazole which is present in a concentration of about 22 to about 36% by weight, where the oxygen containing oxidizer compound and high-temperature slag former is strontium nitrate which is present in a concentration of about 38 to about 62% by weight, and said low-temperature slag former is silicon dioxide which is present in a concentration of about 2 to about 18% by weight.

Alternatively, the fuel and high-temperature slag forming material may comprise the strontium salt of 5-aminotetrazole which is present in a concentration of about 30 to about 50% by weight, where the oxygen containing oxidizer compound is potassium nitrate which is present in a concentration of about 40 to about 60% by weight, and the low-temperature slag former is talc which is present in a concentration of about 2 to about 10% by weight. The talc may be replaced by clay.

Another combination comprises the 5-aminotetrazole which is present in a combination of about 22 to about 36% by weight, where the oxygen containing oxidizer compound is sodium nitrate which is present in a concentration of about 30 to about 50% by weight, the high-temperature slag forming material is magnesium carbonate which is present in a concentration of about 8 to about 30% by weight, and the low-temperature slag former is silicon dioxide which is present in a concentration of about 2 to about 20% by weight. Magnesium carbonate may be replaced by magnesium hydroxide.

Yet another combination comprises the potassium salt of 5-aminotetrazole which is present in a concentration of about 2 to about 30% by weight which serves in part as a fuel and in part as a low-temperature slag former and wherein 5-aminotetraozle in a concentration of about 8 to about 40% by weight also serves as a fuel, and wherein clay in a concentration of about 2 to about 10% by weight serves in part as the low-temperature slag former and wherein strontium nitrate in a concentration of about 40 to about 66% by weight serves as both the oxygen containing oxidizer and high-temperature slag former.

U.S. Pat. No. 5,872,329 discloses nonazide gas generants for a vehicle passenger restraint system employing ammonium nitrate as an oxidizer and potassium nitrate as an ammonium nitrate phase stabilizer. The fuel, in combination with phase stabilized ammonium nitrate, is selected from the group consisting of amine salts of tetrazoles and triazoles having a cationic amine component and an anionic component. The anionic component comprises a tetrazole or triazole ring, and an R group substituted on the 5-position of the tetrazole ring, or two R groups substituted on the 3- and 5-positions of the triazole ring. The R group(s) is selected from hydrogen and any nitrogen-containing compounds such as amino, nitro, nitramino, tetrazolyl and triazolyl groups. The cationic amine component is selected from an amine group including ammonia, hydrazine, guanidine compounds such as guanidine, aminoguanidine, diaminoguanidine, triaminoguanidine, dicyandiamide, nitroguanidine, nitrogen subsituted carbonyl compounds such as urea, carbohydrazide, oxamide, oxamic hydrazide, bis-(carbonamide) amine, azodicarbonamide, and hydrazodicarbonamide, and amino azoles such as 3-amino-1,2,4-triazole, 3-amino-5-nitro-1,2,4-triazole, 5-aminotetrazole and 5-nitraminotetrazole. Optional inert additives such as clay or silica may be used as a binder, slag former, coolant or processing aid. Optional ignition aids comprised of nonazide propellants may also be utilized in place of conventional ignition aids such as $BKNO_3$. The gas generants are prepared by dry blending and compaction of the comminuted ingredients.

Preferred high nitrogen nonazides employed as primary fuels in gas generant compositions include, in particular, amine salts of tetrazole and triazole selected from the group including monoguanidinium salt of 5,5'-Bis-1H-tetrazole (BHT-1 GAD), diguanidinium salt of 5,5'-Bis-1H-tetrazole (BHT-2GAD), monoaminoguanidinium salt of 5,5'-Bis-1H-tetrazole (BHT-1AGAD), diaminoguanidinium salt of 5,5'-Bis-1H-tetrazole (BHT-2AGAD), monohydrazinium salt of 5,5'-Bis-1H-tetrazole (BHT-1HH), dihydrazinium salt of 5,5'-Bis-1H-tetrazole (BHT-2HH), monoammonium salt of 5,5'-bis-1H-tetrazole (BHT-1NH.sub.3), diammonium salt of 5,5'-bis-1H-tetrazole (BHT-2NH$_3$), mono-3-amino-1,2,4-triazolium salt of 5,5'-bis-1H-tetrazole (BHT-1ATAZ), di-3-amino-1,2,4-triazolium salt of 5,5'-bis-1H-tetrazole (BHT-2ATAZ), diguanidinium salt of 5,5'-Azobis-1H-tetrazole (ABHT-2GAD), and monoammonium salt of 5-Nitramino-1H-tetrazole (NAT-1NH$_3$). The nonazide fuel generally comprises 15-65%, and preferably comprises 20-55%, by weight of the total gas generant composition.

The foregoing amine salts of tetrazole or triazole are dry-mixed with phase stabilized ammonium nitrate. The oxidizer is generally employed in a concentration of about 35 to 85% by weight of the total gas generant composition. The ammonium nitrate is stabilized by potassium nitrate, as taught in co-owned U.S. Pat. No. 5,531,941, entitled, "Process For Preparing Azide-Free Gas Generant Composition", and granted on Jul. 2, 1996, incorporated herein by reference. The PSAN comprises 85-90% AN and 10-15% KN and is formed by any suitable means such as co-crystallization of AN and KN, so that the solid-solid phase changes occurring in pure ammonium nitrate (AN) between −40° C. and 107° C. are prevented. Although KN is preferably used to stabilize pure AN, one skilled in the art will readily appreciate that other stabilizing agents may be used in conjunction with AN.

If a slag former, binder, processing aid, or coolant is desired, inert components such as clay, diatomaceous earth, alumina, or silica are provided in a concentration of 0.1-10% of the gas generant composition, wherein toxic effluents generated upon combustion are minimized.

Optional ignition aids, used in conjunction with the present invention, are selected from nonazide gas generant compositions comprising a fuel selected from a group including triazole, tetrazolone, aminotetrazole, tetrazole, or bitetrazole, or others as described in U.S. Pat. No. 5,139,588 to Poole, the teachings of which are herein incorporated by reference. Conventional ignition aids such as $BKNO_3$ are not required because the tetrazole or triazole based fuel, when combined with phase stabilized ammonium nitrate, significantly improves ignitability of the propellant and also provides a sustained burn rate.

Other suitable compositions are set forth in the U.S. patent application Ser. Nos. 10/407,300 and 60/369,775, incorporated herein by reference. Use of a smokeless gas generant composition allows the gas generating system to operate without the need for a filter to remove particulate materials from the inflation gas. It should be appreciated, however, that a filter might be disposed within or external to the gas generating system described herein if desired, for example, in applications wherein a non-smokeless gas generant material is used.

Referring to FIGS. 1 and 6, a baffle system, generally designated 40, is provided for cooling and removing slag from combustion products generated by inflation gas generant composition 64 in combustion chamber 52. As used here, the term "baffle" refers to a device that regulates the flow of a fluid.

As seen in FIGS. 1 and 6, in one embodiment baffle system 40 comprises a first enclosure formed by housing wall 14. A second enclosure 80 is radially inwardly spaced apart from housing wall 14 and defines, in combination with housing wall 14, an annular first fluid flow passage 86 extending between the second enclosure and housing wall 14. Second enclosure 80 includes a base portion 88 extending substantially perpendicular to a longitudinal axis L of the gas generating system, and a generally cylindrical wall 90 extending from base portion 88. Base portion 88 and wall 90 combine to define a baffle chamber 92. At least one first opening 94 is provided in second enclosure wall 90 for enabling fluid communication between main combustion chamber 52 and second enclosure baffle chamber 92. A rupturable, fluid-tight seal 84 as previously described is positioned to seal second enclosure first opening 94. In the embodiment shown in FIG. 1, second enclosure first opening 94 is defined by an edge of second enclosure wall 90, which circumscribes an open end of the second enclosure. In an alternative embodiment (not shown), the second enclosure first opening 94 may be constricted to form an orifice dimensioned to control, in a predetermined manner, the flow of gases therethrough.

In addition, at least one second opening 96 is provided in second enclosure wall 90 for enabling fluid communication between second enclosure baffle chamber 92 and first fluid flow passage 86. In the embodiment shown in FIGS. 1 and 6, a plurality of openings 96 are spaced apart along second enclosure wall 90 for enabling fluid communication between the second enclosure baffle chamber and the first fluid flow passage.

Referring again to FIGS. 1 and 6, a third enclosure 32 is also spaced apart from housing wall 14 to define a second annular fluid flow passage 98 extending between the third enclosure and the wall. Third enclosure 32 includes a base portion 88 extending substantially perpendicular to a longitudinal axis L of the gas generating system, and a generally cylindrical wall 100 extending from base portion 88. Base portion 88 and wall 100 combine to define a baffle chamber 102. Second fluid flow passage 98 is in fluid communication with first fluid flow passage 86. In the embodiment shown in FIG. 1, third enclosure 32 is adjacent second enclosure 80, and second fluid flow passage 98 is contiguous with first fluid flow passage 86. In other embodiments (not shown), the second and third enclosures may be spaced apart and means provided for enabling fluid communication between the respective fluid flow passages 86 and 98 extending between the enclosures and housing wall 14, upon activation of the gas generating system. At least one first opening 104 is provided in third enclosure 32 for enabling fluid communication between second fluid flow passage 98 and third enclosure baffle chamber 102. In the embodiment shown in FIG. 1, a plurality of openings 104 are spaced apart along third enclosure wall 102 for enabling fluid communication between the second fluid flow passage and the third enclosure baffle chamber.

In addition, at least one second opening 106 is provided in third enclosure 32 for enabling fluid communication between the third enclosure baffle chamber and an exterior of the gas generating system. In the embodiment shown in FIG. 1, third enclosure second opening 106 is defined by an edge of third enclosure wall 100, which circumscribes an open end of the second enclosure, and also by a portion of second end closure 18. A rupturable, fluid-tight seal 46 as previously described is positioned to seal third enclosure second opening 106.

In the embodiment shown in FIG. 1, third enclosure 32 abuts second enclosure 80, and second enclosure 80 and third enclosure 32 form a single structure having a common base portion 88. Other embodiments (not shown) are contemplated in which the third enclosure is not positioned adjacent the second enclosure.

As seen in FIG. 1, center plate 70 acts as a barrier separating second enclosure baffle chamber 92 from combustion chamber 52. In addition, it may be seen that center plate 70 acts as a barrier separating first fluid flow passage 86 from combustion chamber 52. Also, center plate 70 and second enclosure wall 90 act as barriers separating first fluid flow passage 86 from gas generant composition 64.

As seen in FIG. 1, base portion 88 of second enclosure 80 and third enclosure 32 acts to prevent direct fluid communication between second enclosure baffle chamber 92 and third enclosure baffle chamber 102. Thus, fluid communication between the second and third enclosure baffle chambers is provided indirectly, via first and second fluid flow passages 86 and 98.

The baffle system described herein is modular in that additional baffle enclosures may be stacked or otherwise positioned along a length of the gas generating system to tailor the length of the flow path of gases through the baffle system, in order to provide varying degrees of cooling of the inflation gases as desired. This principle is described below with reference to FIGS. 7, 7A, 8, and 8A.

Referring to FIGS. 7 and 7A, in another embodiment of the gas generating system, a fourth enclosure 108 is provided spaced apart from housing wall 14 to define a third fluid flow passage 110 extending between fourth enclosure 108 and wall 14. Fourth enclosure 108 includes a base portion 112 extending substantially perpendicular to longitudinal axis L of the gas generating system, and a generally cylindrical wall 114 extending from base portion 112. Base portion 112 and wall 114 combine to define a fourth enclosure baffle chamber 116. Fourth enclosure 108 includes at least one opening 118 for enabling fluid communication between third enclosure baffle chamber 102 and fourth enclosure baffle chamber 116. Fourth enclosure 108 also includes at least one opening 120 for enabling fluid communication between fourth enclosure baffle chamber 116 and third fluid flow passage 110.

As seen in FIG. 7, third fluid flow passage 110 is not in fluid communication with second fluid flow passage 98. This ensures that gases generated by combustion of gas generant 64 will traverse the baffle system by alternately passing through successive baffle chambers and their associated annular fluid flow passages, in a manner described in greater detail below. In addition, in the embodiment shown in FIG. 7, third fluid flow passage 110 is in fluid communication with the exterior of the gas generating system via channels 122 formed in second end closure 18, which connect third fluid flow passage 110 with gas exit manifold shaft 44.

Referring to FIGS. 8 and 8A, in another alternative embodiment, a fifth enclosure 124 is provided spaced apart from housing wall 14 to define a fourth fluid flow passage 126 extending between fifth enclosure 124 and wall 14. Fourth fluid flow passage 126 is in fluid communication with third fluid flow passage 110. In the embodiment shown in FIG. 8, fourth fluid flow passage 126 is contiguous with third fluid flow passage 110. Fifth enclosure 124 is defined by a generally cylindrical wall 130 positioned to abut fourth enclosure 108. Wall 130 defines a fifth enclosure baffle chamber 132. Fifth enclosure 124 includes at least one opening 134 for enabling fluid communication between fourth fluid flow passage 126 and fifth enclosure baffle chamber 132. Fifth enclosure 124 also includes at least one opening 136 for enabling fluid communication between fifth enclosure baffle chamber 132 and the exterior of the gas generating system.

Any or all of the openings formed in the enclosures described above may be sized to regulate, in a desired manner, a flow of combustion products from the inflation gas generant combustion chamber to an exterior of the gas generating system. For example, center plate orifice (or orifices) 82 may be sized to act as flow regulators to regulate a flow of combustion products from combustion chamber 52 to second enclosure baffle chamber 92, to correspondingly regulate the time period between activation the gas generating system and the emission of inflation gases from gas exit manifold 38. All of the baffle members described above may be stamped, drawn, cast and finish machined, or otherwise formed from steel or another suitable metal or metal alloy.

Referring to FIG. 1, to assemble gas generator 10, second end closure 18 is positioned and secured within housing wall 14, and an end portion of wall 14 is then crimped over second end closure 18 to secure the end closure in position. An end portion of third enclosure 32 is then press-fit within second end closure shoulder 26, thereby defining second fluid flow passage 98 extending between housing wall 14 and third enclosure 32. Second enclosure 80 is then positioned adjacent third enclosure 32 to form first fluid flow passage 86. If second enclosure 80 forms a monolithic block with third enclosure 32, as seen in FIG. 1, second enclosure 80 and third enclosure 32 are positioned simultaneously as shown within housing 12. Center plate 70 is then positioned within housing 12 to engage a portion of second enclosure 80 in an interference fit, as previously described. An end portion of annular sleeve 56 is then inserted into the recess 72 formed along the outer edge of center plate 70, thereby centering sleeve 56 and forming an interference fit between sleeve 56 and center plate 70. The main gas generant composition 64 is positioned within combustion chamber 52 residing adjacent center plate 70, and ignition cup 48 is positioned within housing 12 so that an end portion of sleeve 56 resides within ignition cup recess 54, thereby engaging the ignition cup in an interference fit. First end closure 16 containing the igniter assembly is then positioned to abut an end portion of ignition cup 48, and end portions of housing 12 are crimped over first end closure 22 to secure the end closure in position.

Operation of the gas generator will now be discussed with reference to FIGS. 1-6. Upon receipt of a signal from a crash sensor, an electrical activation signal is sent to igniter 68. Combustion products from the igniter expand into cavity 48c, igniting booster compound 50 positioned in cavity 48c. Products from the combustion of booster compound 50 proceed out of cavity 48c through ignition cup orifice 48d. The time required for initiation of combustion of the gas generant in combustion chamber 52 is believed to be dependent on the dimensions of ignition cup orifice 48d. For example, it is believed that where ignition cup orifice 48d is relatively smaller in size, propagation of booster combustion products from cavity 48c to combustion chamber 52 will be delayed, thereby correspondingly delaying the onset of combustion of gas generant 64 in combustion chamber 52.

Products from combustion of gas generant 64 proceed through center plate orifices 82 into respective second enclosure baffle chamber 92, then into first and second flow passages 86 and 98, and then into third enclosure baffle chamber 102. From there, the gases exit through orifices 42 formed in gas exit manifold 38 and out of holes 42 to inflate an associated airbag (not shown). Thus, as seen in FIGS. 1-6, gases produced in combustion chamber 52 flow alternately through baffle chambers and associated flow passages, during which the gases are cooled and slag is removed from the gases.

Operation of the embodiments shown in FIGS. 7, 7A, 8, and 8A is substantially identical to that described for the embodiment shown in FIGS. 1-6. Gases produced in combustion chamber 52 flow alternately through baffle chambers and associated flow passages, during which the gases are cooled and slag is removed from the gases.

The gas generating system described herein provides several advantages over known designs. The degree of cooling of the gases may be varied according to design requirements by varying the number and arrangement of baffle enclosures within the gas generating system housing. In addition, the use of interference fits and other securement means obviate the need for welds in assembly of the gas generator. Also, by controlling the dimensions of the orifice positioned between the igniter assembly and the inflation gas generant in the main combustion chamber, the time period between activation of the igniter and initiation of combustion of the gas generant composition may be correspondingly controlled.

In a particular application, the gas generating system described above is incorporated into an airbag module of a vehicle occupant protection system. Referring to FIG. 9, any embodiment of the gas generator described herein may be incorporated into an airbag system 200. Airbag system 200 includes at least one airbag 202 and a gas generating system 10 as described herein coupled to the airbag so as to enable fluid communication with an interior of the airbag. Airbag system 200 may also be in communication with a known crash event sensor 210 that is in operative communication with a known crash sensor algorithm (not shown) which signals actuation of airbag system 200 via, for example, activation of igniter 68 (not shown in FIG. 9) in the event of a collision.

Referring again to FIG. 9, an embodiment of the gas generator or an airbag system including an embodiment of the gas generator may be incorporated into a broader, more comprehensive vehicle occupant restraint system 180 including additional elements such as a safety belt assembly. Safety belt assembly 150 includes a safety belt housing 152 and a safety belt 160 extending from housing 152. A safety belt retractor mechanism 154 (for example, a spring-loaded mechanism) may be coupled to an end portion of the belt. In addition, a safety belt pretensioner 156 may be coupled to belt retractor mechanism 154 to actuate the retractor mechanism in the event of a collision. Typical seat belt retractor mechanisms which may be used in conjunction with safety belt 100 are described in U.S. Pat. Nos. 5,743,480, 5,553, 803, 5,667,161, 5,451,008, 4,558,832 and 4,597,546, incorporated herein by reference. Illustrative examples of typical pretensioners with which safety belt 160 may be combined are described in U.S. Pat. Nos. 6,505,790 and 6,419,177, incorporated herein by reference.

Safety belt assembly 150 may be in communication with a known crash event sensor 158 (for example, an inertia sensor or an accelerometer) that is in operative communication with a known crash sensor algorithm (not shown) which signals actuation of belt pretensioner 156 via, for example, activation of a pyrotechnic igniter (not shown) incorporated into the pretensioner. U.S. Pat. Nos. 6,505,790 and 6,419,177, previously incorporated herein by reference, provide illustrative examples of pretensioners actuated in such a manner.

It will be appreciated that the various constituents described above are formed in known manners. For example, the baffles and various chambers may be molded, stamped or otherwise metal formed from carbon steel, aluminum, metallic alloys, or polymeric equivalents.

It will be understood that the foregoing description of the present invention is for illustrative purposes only, and that the various structural and operational features herein disclosed are susceptible to a number of modifications, none of which departs from the spirit and scope of the present invention. The preceding description, therefore, is not meant to limit the scope of the invention. Rather, the scope of the invention is to be determined only by the appended claims and their equivalents.

What is claimed is:

1. A gas generating system comprising:
a baffle system for cooling a gas generated by the gas generating system, the baffle system including:
a first enclosure;
a second enclosure spaced apart from a wall of the first enclosure to define a first fluid flow passage between the second enclosure and the wall, the second enclosure defining a baffle chamber therein, the second enclosure including at least one first opening for enabling fluid communication between a gas source and the second enclosure baffle chamber, and at least one second opening for enabling fluid communication between the second enclosure baffle chamber and the first fluid flow passage; and
a third enclosure spaced apart from the wall of the first enclosure to define a second fluid flow passage between the third enclosure and the wall, the second fluid flow passage being in fluid communication with the first fluid flow passage, the third enclosure defining a baffle chamber therein, the third enclosure including at least one first opening for enabling fluid communication between the second fluid flow passage and the third enclosure baffle chamber, and at least one second opening for enabling fluid communication between the third enclosure baffle chamber and an exterior of the gas generating system,
wherein all generated gas flowing to the exterior of the gas generating system is directed through the third enclosure baffle chamber.

2. The gas generating system of claim 1 further comprising a rupturable, fluid-tight seal positioned to seal the at least one second enclosure first opening.

3. The gas generating system of claim 1 further comprising a rupturable, fluid-tight seal positioned to seal the at least one third enclosure second opening.

4. The gas generating system of claim 1 wherein the third enclosure is positioned adjacent the second enclosure.

5. The gas generating system of claim 1 wherein the second enclosure and the third enclosure from a single structure.

6. The gas generating system of claim 1 wherein the third enclosure abuts the second enclosure.

7. The gas generating system of claim 1 wherein the second fluid flow passage is contiguous with the first fluid flow passage.

8. The gas generating system of claim 1 wherein the gas source is a gas generant combustion chamber and the gas generating system further includes a barrier separating the second enclosure baffle chamber from the combustion chamber.

9. The gas generating system of claim 1 wherein the gas source is a gas generant combustion chamber and the gas generating system further includes a barrier separating the first fluid flow passage from the combustion chamber.

10. The gas generating system of claim 1 wherein the third enclosure is positioned adjacent the second enclosure along a longitudinal dimension of the gas generating system.

11. The gas generating system of claim 1 further comprising a gas generant composition and a barrier separating the first fluid flow passage from the gas generant composition.

12. The gas generating system of claim 11 wherein the gas generant composition is a smokeless gas generant composition.

13. The gas generating system of claim 1 further comprising a fourth enclosure spaced apart from a wall of the first enclosure to define a third fluid flow passage between the fourth enclosure and the wall, the fourth enclosure defining a baffle chamber therein, the fourth enclosure including at least one opening for enabling fluid communication between the third enclosure baffle chamber and the fourth enclosure baffle chamber; and
at least one opening for enabling fluid communication between the fourth enclosure baffle chamber and the third fluid flow passage,
wherein the third fluid flow passage is not in fluid communication with the second fluid flow passage, and the third fluid flow passage is in fluid communication with the exterior of the gas generating system.

14. The gas generating system of claim 13 further comprising a fifth enclosure spaced apart from a wall of the first enclosure to define a fourth fluid flow passage between the fifth enclosure and the wall, the fourth fluid flow passage being in fluid communication with the third fluid flow passage, the fifth enclosure defining a baffle chamber therein, the fifth enclosure including at least one opening for enabling fluid communication between the fourth fluid flow passage and the fifth enclosure baffle chamber, and
at least one opening for enabling fluid communication between the fifth enclosure baffle chamber and the exterior of the gas generating system.

15. The gas generating system of claim 14 wherein the fourth fluid flow passage is contiguous with the third fluid flow passage.

16. The gas generating system of claim 1 further comprising:
a gas generant composition;
an ignition source for igniting the gas generant composition upon activation of the gas generating system; and
a barrier positioned between the gas generant composition and the ignition source, the barrier including an orifice to enable fluid communication between the ignition source and the gas generant composition, the orifice defining a Venturi tube.

* * * * *

UNITED STATES PATENT AND TRADEMARK OFFICE
CERTIFICATE OF CORRECTION

PATENT NO. : 7,343,862 B2
APPLICATION NO. : 11/138226
DATED : March 18, 2008
INVENTOR(S) : McCormick Page 1 of 1

It is certified that error appears in the above-identified patent and that said Letters Patent is hereby corrected as shown below:

Column 5; Line 31; delete "by" and insert --bv--

Column 14; Claim 5; Line 58; delete "from" and insert --form--

Signed and Sealed this

Twelfth Day of August, 2008

JON W. DUDAS
*Director of the United States Patent and Trademark Office*